(12) United States Patent
Sakurai (10) Patent No.: US 7,486,942 B2
(45) Date of Patent: Feb. 3, 2009

(54) RECEIVER

(75) Inventor: Shoji Sakurai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 434 days.

(21) Appl. No.: 11/094,274

(22) Filed: Mar. 31, 2005

(65) Prior Publication Data

US 2005/0233721 A1    Oct. 20, 2005

(30) Foreign Application Priority Data

Apr. 2, 2004   (JP)   .............................. 2004-109612

(51) Int. Cl.
*H04B 1/26* (2006.01)
*H04B 15/00* (2006.01)

(52) U.S. Cl. .................. 455/314; 455/323; 455/305; 455/226.2; 455/311; 455/250.1

(58) Field of Classification Search .................. 455/296, 455/305, 311, 302, 314, 226.1, 226.2, 226.4, 455/338, 340, 313, 315, 323, 234.1, 245.1, 455/250.1

See application file for complete search history.

(56) References Cited

U.S. PATENT DOCUMENTS

| | | | | |
|---|---|---|---|---|
| 4,414,686 A * | 11/1983 | Lenz | ............................ | 455/20 |
| 5,001,776 A * | 3/1991 | Clark | ...................... | 455/226.2 |
| 5,027,430 A | 6/1991 | Yamauchi et al. | | |
| 5,437,051 A * | 7/1995 | Oto | ............................ | 455/3.02 |
| 5,513,386 A * | 4/1996 | Ogino et al. | ............. | 455/234.1 |
| 5,742,896 A * | 4/1998 | Bose et al. | ................... | 455/133 |
| 6,014,571 A * | 1/2000 | Enoki | ....................... | 455/552.1 |
| 6,026,288 A * | 2/2000 | Bronner | .................... | 455/343.2 |
| 6,311,048 B1 | 10/2001 | Loke | | |
| 6,345,176 B1 * | 2/2002 | Mattisson | .................... | 455/296 |
| 6,442,382 B1 * | 8/2002 | Busking | ..................... | 455/266 |
| 6,545,516 B2 * | 4/2003 | Ylamurto et al. | ............ | 327/113 |
| 2004/0063416 A1 * | 4/2004 | Kuenen et al. | .............. | 455/313 |

FOREIGN PATENT DOCUMENTS

| | | |
|---|---|---|
| JP | 4-50670 | 11/1992 |
| JP | 5-344016 | 12/1993 |
| JP | 7-30445 A | 1/1995 |

* cited by examiner

*Primary Examiner*—Edward Urban
*Assistant Examiner*—RuiMeng Hu
(74) *Attorney, Agent, or Firm*—Birch, Stewart, Kolasch & Birch, LLP (57) ABSTRACT

In a receiver, a mixer portion provided in a front-end portion thereof is built with two mixers with different input/output linearity characteristics and different current consumption. According to the electric-field strength of a received signal, or manually, one of the mixers is chosen to operate so that, when the electric-field strength is in an ordinary range, the mixer with a better input/output linearity characteristic is chosen to operate with lower current consumption and, when the electric-field strength is in a high range, the mixer that, despite operating with higher current consumption, exhibits a still better input/output linearity characteristic is chosen. The receiver thus operates with lower current consumption and lower signal distortion.

10 Claims, 5 Drawing Sheets

RECEIVER

This nonprovisional application claims priority under 35 U.S.C. § 119(a) on Patent Application No. 2004-109612 filed in Japan on Apr. 2, 2004, the entire contents of which are hereby incorporated by reference.

BACKGROUND OF THE INVENTION

1. Field of the Invention

The present invention relates to a receiver, and more particularly to a receiver incorporating a mixer that converts a received radio-frequency signal into a signal having a predetermined frequency.

2. Description of Related Art

Figure 8:
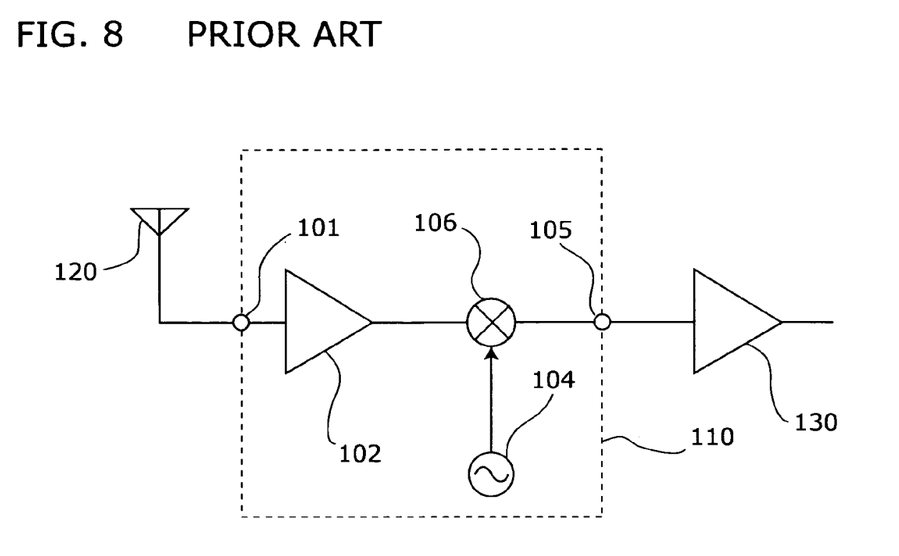
FIG. 8 is a block diagram showing a portion around a front-end portion of a conventional receiver.

In general, a receiver employing a radio-frequency wireless system such as satellite broadcast, satellite communication, or wireless telephony receives a radio-frequency signal in the GHz band to reproduce an original signal therefrom. FIG. 8 is a block circuit diagram of a typical front-end portion of a radio-frequency circuit used in such a receiver.

A radio-frequency signal received via an antenna 120 of a receiver is fed, via an input terminal 101 of a front-end portion 110, to a low-noise amplifier 102 that amplifies the radio-frequency signal, which is in the GHz band. The amplified radio-frequency signal is then fed to one input terminal of a mixer 106 provided in the succeeding stage. To the other input terminal of this mixer 106 is fed, from a local oscillator 104, a local oscillation signal having a frequency different from that of the received radio-frequency signal. As a result, an intermediate-frequency signal having a frequency equal to the difference between the frequency of the received radio-frequency signal and that of the local oscillation signal is outputted from the mixer 106 to an output terminal 105. This intermediate-frequency signal is then amplified by an intermediate-frequency amplifier 130 provided in the succeeding stage, and is then subjected to predetermined processing for signal reproduction.

Incorporating the front-end portion 110 configured as described above, the receiver has the following problem. The input/output linearity characteristic of the low-noise amplifier 102, in particular that of the mixer 106, greatly affects the distortion that the signal suffers in the receiver. That is, with a poor input/output linearity characteristic, when a signal with a high electric-field strength is received, the signal obtained by receiving that signal suffers distortion.

Figure 9:
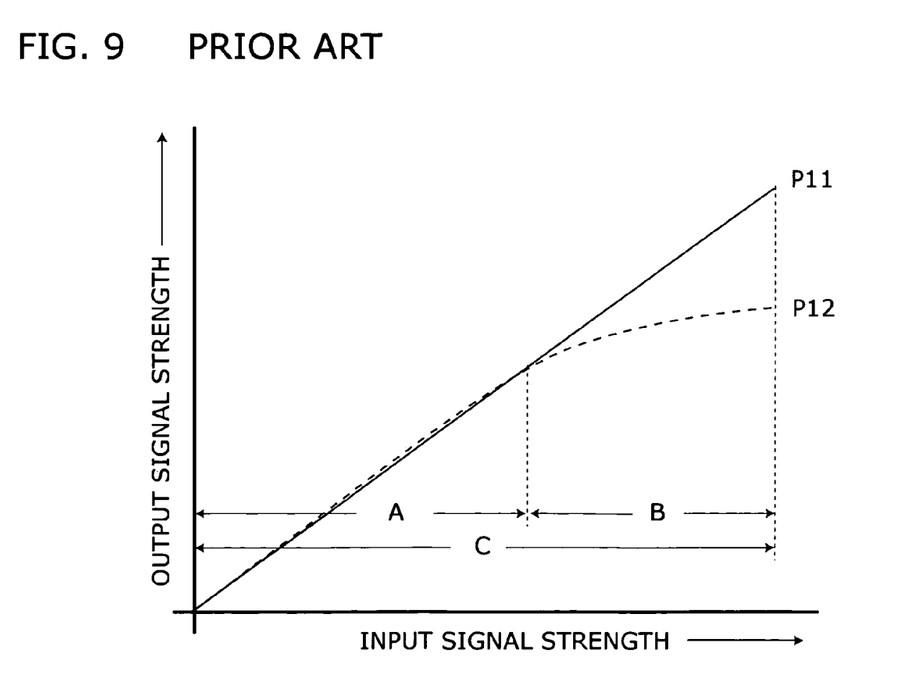
FIG. 9 is a diagram schematically showing the input/output characteristics, ideal and actually observed, of a conventional mixer.

FIG. 9 is a diagram schematically showing the input/output characteristic of a mixer that is commonly used in a radio-frequency circuit to produce an intermediate-frequency signal. A receiver is required to be capable of receiving a signal of which the electric-field strength varies in a wide range. Thus, in the receiver, a signal of which the electric-field strength varies in a wide range is amplified by a low-noise amplifier having a predetermined gain, and is then fed to a mixer. In FIG. 9, the horizontal axis represents the signal strength of the signal that is fed to the mixer, which signal strength is referred to as the input signal strength. The input signal strength is proportional to the electric-field strength of the received radio-frequency signal. The vertical axis, on the other hand, represents the signal strength of the intermediate-frequency signal that is outputted from the mixer, which signal strength is referred to as the output signal strength.

In FIG. 9, the range indicated by C is the range of the input signal strength of the mixer, i.e., the range in which the input signal strength is proportional to the received electric-field strength. The input/output linearity characteristic curve P11 indicates an ideal linear relationship between the input and output signal strengths. By contrast, the input/output linearity characteristic curve P12 indicates the input/output linearity characteristic actually observed with a mixer 106 commonly used, for example, in a conventional front-end portion 110 as shown in FIG. 8. A mixer should ideally exhibit a linear relationship over the entire range C as indicated by the input/output linearity characteristic curve P11. In reality, however, a commonly used mixer, while exhibiting a close-to-linear characteristic in an ordinary-input-signal-strength range A, i.e., the range where the input signal strength is ordinary, exhibits a non-linear characteristic in a high-input-signal-strength range B, i.e., the range where the electric-field strength, and thus the input signal strength, is high.

For this reason, in a front-end portion incorporating a single-gain low-noise amplifier, when a signal having a high electric-field strength is received, in the stage succeeding the low-noise amplifier, the intermediate-frequency signal suffers distortion mainly attributable to the input/output linear characteristic of the mixer, with the result that the data carried by the signal is damaged. One solution to this problem is to design the front-end portion, in particular the mixer, to exhibit an ideal linearity characteristic over the entire range C mentioned above. Undesirably, however, designing the mixer that way results, as an inevitable consequence attributable to the characteristics of a transistor, increased current consumption by the transistor. In particular in portable wireless telephones and portable wireless communication apparatuses such as personal digital assistants incorporating wireless communication circuits, minimizing the current consumption is one of the important challenges.

For this reason, reduction of signal distortion is often attempted by lowering the gain of a low-noise amplifier when a signal having a high electric-field strength is fed to the low-noise amplifier. This is exemplified by the technique disclosed in Japanese Patent Application Laid-Open No. H7-30445. According to this technique, the electric-field strength of a received signal is detected, and, if the detected electric-field strength is higher than a predetermined value, the gain of a low-noise amplifier is lowered.

Varying the gain of a low-noise amplifier, however, requires the use of a variable-gain low-noise amplifier. A variable-gain low-noise amplifier, to permit the gain thereof to be varied, requires many extra circuits, and is thus more likely to generate noise than a fixed-gain low-noise amplifier. Moreover, even a variable-gain low-noise amplifier is not free from conventionally experienced problem when fed with a signal having an electric-field strength higher than it can cope with.

SUMMARY OF THE INVENTION

In view of the conventionally encountered inconveniences discussed above, it is an object of the present invention to provide a receiver incorporating a front-end portion that operates with lower current consumption and that can choose, as necessary, a mixer producing lower signal distortion.

To achieve the above object, according to the present invention, a receiver is provided with: a low-noise amplifier that amplifies a received signal to output an amplified signal; local oscillator that oscillates a local oscillation signal having a frequency different from the frequency of the amplified signal; and a mixer portion that receives the amplified signal and the local oscillation signal to convert the amplified signal into an intermediate-frequency signal having a frequency different from the frequency of the amplified signal and then output the intermediate-frequency signal. Here, the mixer portion is provided with: a first mixer that exhibits a closely linear input/output characteristic in a high-signal-strength range where the amplified signal has a high signal strength; and a second mixer that operates with lower current consumption than the first mixer and that exhibits, in an ordinary-signal-strength range where the amplified signal has an ordinary signal strength, a linear input/output characteristic and, in the high-signal-strength range where the amplified signal has a signal strength higher than in the ordinary-signal-strength range, a less linear input/output characteristic than the first mixer. In the mixer portion, one of the first and second mixers is chosen to operate.

With this configuration, it is possible to choose a mixer that is actually made to operate. Thus, it is possible to use the characteristics of the two mixers effectively and thereby perform signal reproduction with lower distortion and lower current consumption.

The receiver described above may be further provided with: a mixer switching circuit that receives a switching signal to choose and actuate one of the first and second mixers; a signal strength detection portion that detects and outputs the signal strength of the intermediate-frequency signal; and a mixer switching control portion that receives the signal strength to calculate the electric-field strength of the received signal based on the sum of the gain of the low-noise amplifier and the gain of whichever of the first and second mixers is chosen and that then, according to the calculated electric-field strength, feeds the switching signal to the mixer switching circuit.

With this configuration, it is possible to choose, automatically according to the electric-field strength of the received signal, the mixer that is actually made to operate. Thus, it is possible to efficiently perform signal reproduction with lower distortion and lower current consumption.

In the receiver described above, the low-noise amplifier may be a variable-gain low-noise amplifier of which the gain can be varied.

With this configuration, the mixer in the succeeding stage is, for a longer period of time and with more likeliness, fed with a signal of which the signal strength is in an ordinary range, permitting the mixer operating with lower current consumption to be used for a longer period of time. Thus, it is possible to perform signal reproduction with lower distortion and still lower current consumption.

Alternatively, the receiver described above may be further provided with: a mixer switching circuit that receives a switching signal to choose and actuate one of the first and second mixers; a signal strength detection portion that detects and outputs the signal strength of the intermediate-frequency signal; a mixer switching control portion that receives the signal strength to calculate the electric-field strength of the received signal based on the sum of the gain of the low-noise amplifier and the gain of whichever of the first and second mixers is chosen and that then, according to the calculated electric-field strength, feeds the switching signal to the mixer switching circuit; and a gain switching control portion that receives the signal strength to calculate the electric-field strength of the received signal based on the sum of the gain of the low-noise amplifier and the gain of whichever of the first or second mixers is chosen and that then, according to the calculated electric-field strength, feeds a gain setting signal to the variable-gain low-noise amplifier to set the gain thereof.

With this configuration, the setting of the gain of the low-noise amplifier and the switching between the mixers are performed automatically. Thus, the mixer in the succeeding stage is, for a still longer period of time and with still more likeliness, fed with a signal of which the signal strength is in an ordinary range, permitting the mixer operating with lower current consumption to be used for a longer period of time. Thus, it is possible to perform signal reproduction with lower distortion and still lower current consumption.

DETAILED DESCRIPTION OF PREFERRED EMBODIMENTS

First Embodiment

Figure 1:
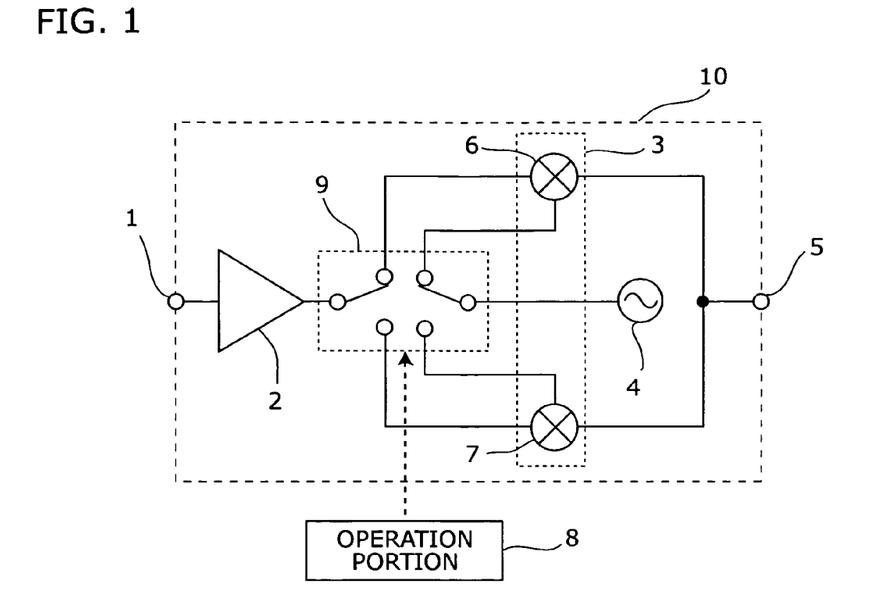
FIG. 1 is a block diagram showing a front-end portion of the receiver of a first embodiment of the invention.

A first embodiment of the present invention will be described below with reference to the drawings. FIG. 1 is a block diagram showing a front-end portion of the receiver of the first embodiment.

In FIG. 1, the front-end portion 10 is composed of: an input terminal 1 via which a radio-frequency signal received via an unillustrated antenna is fed in; a low-noise amplifier 2; a mixer portion 3; a local oscillator 4; an output terminal 5, and a switching circuit 9. In a receiver incorporating the front-end portion 10 shown in FIG. 1, the radio-frequency signal fed in via the input terminal 1 is first amplified by the low-noise amplifier 2, and is then fed to the mixer portion 3. In the mixer portion 3, the amplified radio-frequency signal is mixed with a local oscillation signal outputted from the local oscillator 4. Here, the frequency of the channel to be selected and received is converted into an intermediate-frequency signal having a frequency equal to the difference between the frequency of the channel and that of the local oscillation signal. The intermediate-frequency signal thus obtained through the conversion performed by the mixer portion 3 is then fed out via the output terminal 5 to an unillustrated circuit provided in the succeeding stage.

Figure 2:
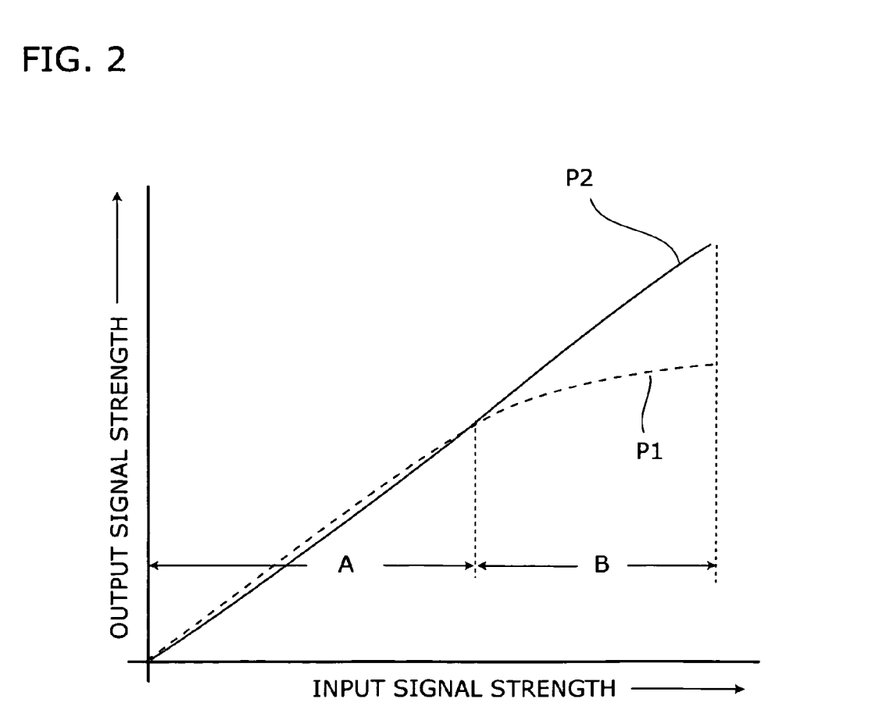
FIG. 2 is a diagram schematically showing the input/output linearity characteristics of the two mixers provided in the mixer portion shown in FIG. 1.

FIG. 2 is a diagram schematically showing the input/output linearity characteristics of mixers 6 and 7 provided in the mixer portion 3 shown in FIG. 1. The horizontal axis represents the signal strength of the signal that is fed to the mixers, which signal strength is referred to as the input signal strength. The input signal strength is proportional to the electric-field strength of the received radio-frequency signal. The vertical axis, on the other hand, represents the signal strength of the intermediate-frequency signal that is outputted from the mixers, which signal strength is referred to as the output signal strength. The input/output linearity characteristic curve P1 indicates the input/output linearity characteristic of the mixer 6, which is configured as a low-current mixer that exhibits a close-to-linear input/output characteristic, exhibits a satisfactory noise characteristic, and operates with low current consumption in an ordinary-input-signal-strength range A, i.e., the range where the input signal strength is ordinary. The input/output linearity characteristic curve P2 indicates the input/output linearity characteristic of the mixer 7, which is configured as a high-linearity mixer that, despite operating with higher current consumption, exhibits an excellent input/output linearity characteristic.

Thus, the mixer portion 3 is composed of mixers 6 and 7 having different characteristics, and one of the mixers 6 and 7 is chosen to operate by the switching circuit 9. In the ordinary-input-signal-strength range A where the input signal strength, and thus the electric-field strength of the received signal, is not high, the low-current mixer 6 exhibits a close-to-linear input/output characteristic, and operates with less current consumption than the high-linearity mixer 7. This makes the low-current mixer 6 suitable as the one for ordinary use.

With the front-end portion 10 configured as described above, when an operation portion 8 provided in the receiver is operated by the user, the mixer used by the mixer portion 3 is switched by the switching circuit 9 between the low-current mixer 6 and the high-linearity mixer 7. For example, if, while the low-current mixer 6 is being used in the ordinary use state, the electric-field strength of the received radio-frequency signal increases and moves into the range B shown in FIG. 2, the signal distortion in the output signal fed out via the output terminal 5 grows higher, and thus the user recognizes, from the sounds and pictures reproduced, that the output signal from the output terminal 5 has deteriorated. Then, the user can operate the operation portion 8 so that, via the switching circuit 9, the mixer used by the mixer portion 3 is switched to the high-linearity mixer 7. This switching from the low-current mixer 6 to the high-linearity mixer 7 makes it possible to reduce the distortion in the signal waveform of the intermediate-frequency signal obtained through the conversion performed by the mixer portion 3, and thereby makes it possible to obtain a satisfactory output signal from the output terminal 5.

In this embodiment, a switch provided on the operation portion 8 may be allocated as one for making the switching circuit 9 operate. The receiver may be provided with, for example, a low-power-consumption mode and a high-quality-reproduction mode so that, at the same time that one of these modes is chosen through the operation of the operation portion 8, a mixer switching signal is fed to the switching circuit 9 to choose either the low-current mixer 6 or the high-linearity mixer 7.

Second Embodiment

Figure 3:
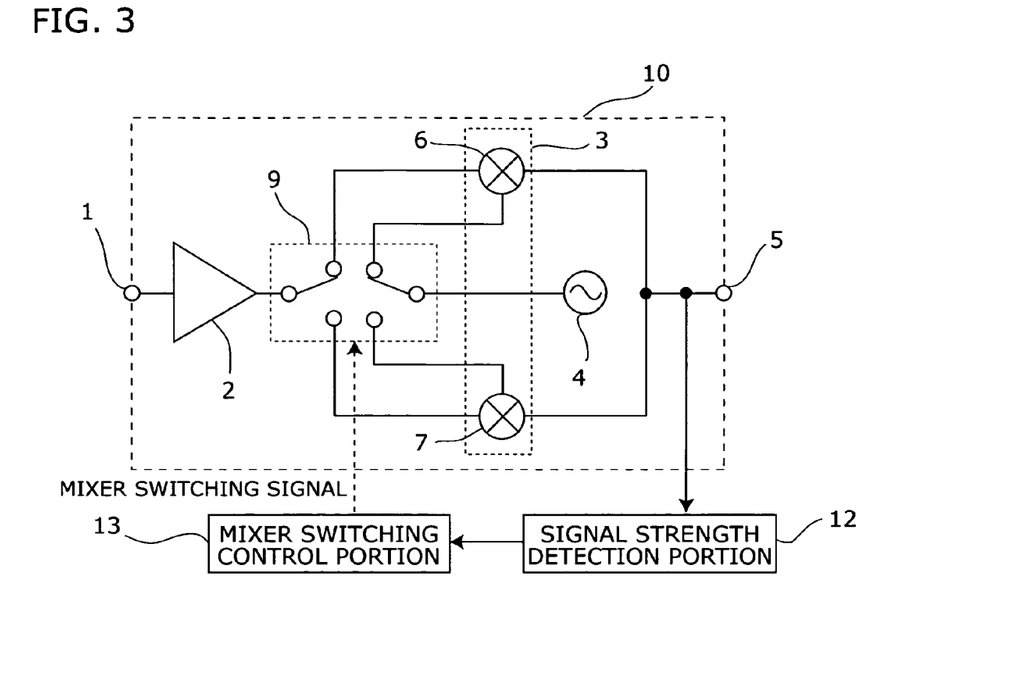
FIG. 3 is a block diagram showing a front-end portion of the receiver of a second embodiment of the invention.
Figure 4:
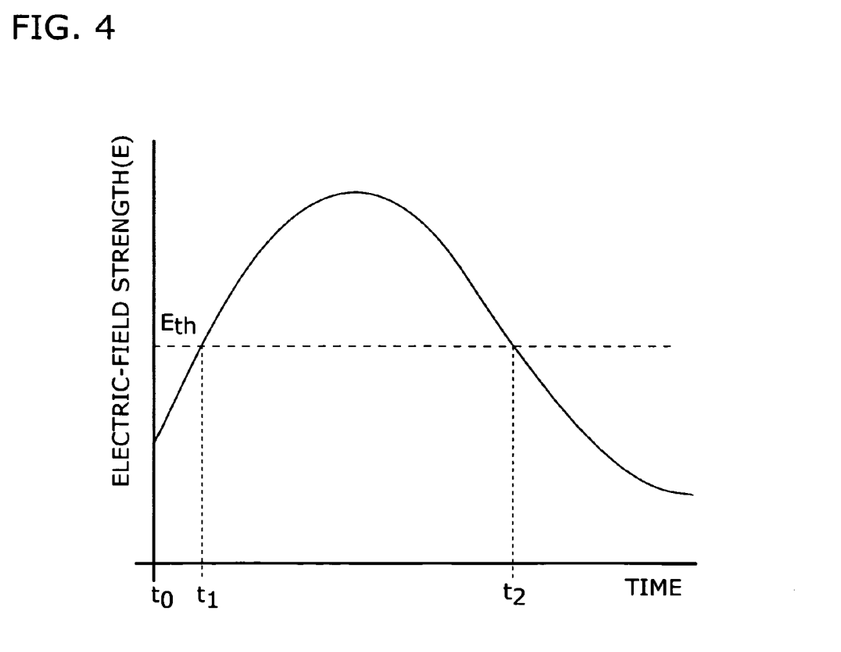
FIG. 4 is a diagram illustrating how the mixers are switched according to the electric-field strength.

A second embodiment of the present invention will be described below with reference to the drawings. FIG. 3 is a block diagram showing a front-end portion of the receiver of the second embodiment. In the receiver shown in FIG. 3, such portions as are found also in the receiver shown in FIG. 1 are identified with common reference numerals, and their detailed explanations will not be repeated. FIG. 4 is a diagram illustrating how the mixers are switched according to the electric-field strength. In FIG. 4, the vertical axis represents the received electric-field strength E, and the horizontal axis represents the lapse of time.

As compared with the receiver shown in FIG. 1, the receiver shown in FIG. 3 lacks the operation portion 8 and is instead additionally provided with: a signal strength detection portion 12 that detects the signal strength of the intermediate-frequency signal outputted from the mixer portion 3; and a mixer switching control portion 13 that calculates, through backward calculation based on the detected signal strength and the sum gain of the low-noise amplifier 2 and the mixer being used by the mixer portion 3, the electric-field strength E of the received radio-frequency signal and that then compares the calculated electric-field strength E with a predetermined threshold value Eth therefor to feed, according to the result of the comparison, a mixer switching signal to the switching circuit 9 to instruct it to switch the mixer used by the mixer portion 3.

In FIG. 4, during the period from time point t0 to time point t1, the electric-field strength E lower than or equal to the threshold value Eth, and thus the mixer portion 3 chooses and uses the low-current mixer 6. During this period, the mixer switching control portion 13 calculates the electric-field strength E of the received radio-frequency signal through backward calculation based on the signal strength of the intermediate-frequency signal as detected by the signal strength detection portion 12 and the sum gain of the low-noise amplifier 2 and the low-current mixer 6. When the mixer switching control portion 13 finds the electric-field strength E higher than or equal to the predetermined threshold value Eth, then, at time point t1, the mixer switching control portion 13 feeds a mixer switching signal to the switching circuit 9 so that the mixer used by the mixer portion 3 is switched to the high-linearity mixer 7.

Later, at time point t2, while the mixer portion 3 is using the high-linearity mixer 7, the mixer switching control portion 13 calculates the electric-field strength E of the received radio-frequency signal through backward calculation based on the detected signal strength of the intermediate-frequency signal and the sum gain of the low-noise amplifier 2 and the high-linearity mixer 7. When the mixer switching control portion 13 finds the electric-field strength E of the radio-frequency signal lower than the predetermined threshold value Eth, then the mixer switching control portion 13 feeds a mixer switching signal to the switching circuit 9 so that the mixer used by the mixer portion 3 is switched to the low-current mixer 6.

The method of switching mixers as shown in FIG. 4 is effective in cases where the variation of electric-field strength is comparatively gentle as when it starts to rain during reception of satellite broadcast or when a cellular phone is used while being carried around. However, when reception is being performed at an electric-field strength close to the threshold value Eth, if the electric-field strength frequently fluctuates across the threshold value Eth, the mixers are switched as frequently. This may cause the user to feel that reproduction from the received signal is being performed unnaturally.

In this case, advisably, the mixer switching control portion 13 may first confirm that, after the electric-field strength E crossed the threshold value Eth, the resulting state has persisted for a predetermined period of time or longer and only then perform switching in the mixer portion 3. Specifically, while the low-current mixer 6 is being used, when the electric-field strength E becomes higher than the threshold value Eth, only if the resulting state is later recognized to have persisted for a predetermined period of time or longer, switching to the high-linearity mixer 7 is performed. On the other hand, while the high-linearity mixer 7 is being used, when the electric-field strength E becomes lower than the threshold value Eth, only if the resulting state is later recognized to have persisted for a predetermined period of time or longer, switching to the low-current mixer 6 is performed.

Figure 5:
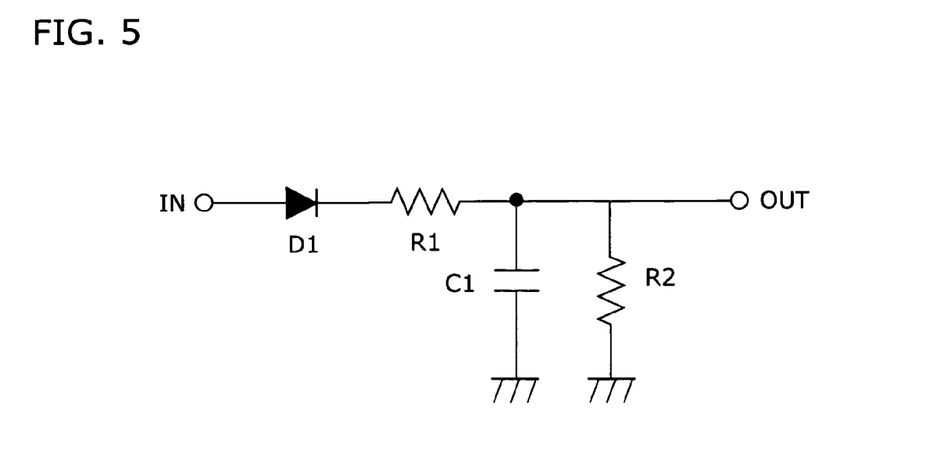
FIG. 5 is a circuit diagram of an example of the circuit for calculating the mean value of the electric-field strength in a predetermined period of time.

Alternatively, it is also possible to use a mean value calculation circuit as shown in FIG. 5 to calculate the mean value of the electric-field strength in a predetermined period of time. It should be understood that FIG. 5 merely shows a comparatively simple example of such a circuit and that a mean value calculation circuit for calculating the mean value of the electric-field strength in a predetermined period of time can be built with any other combination of devices. In FIG. 5, the signal detected by the signal strength detection portion 12 is fed in via an input terminal IN. This signal is then rectified by a diode D1, and is then converted, by the resistances of resistors R1 and R2 and the capacitance of a capacitor C1, into a voltage, i.e., the voltage appearing across the capacitor C1, that varies gently according to the substantially mean value of the signal strength proportional to the electric-field strength. This voltage is then fed out via an output terminal OUT. The mixer switching control portion 13 may compare this output with a predetermined value to switch the mixers. This permits the output voltage from the output terminal OUT to remain, when the electric-field strength is largely high, high on a mean basis and, when the electric-field strength is largely low, low on a mean basis. In this way, it is possible to avoid the influence of abrupt or instantaneous fluctuations in electric-field strength.

With the configuration described above, the switching of the mixer used by the mixer portion 3 between the low-current mixer 6 and the high-linearity mixer 7 can be performed automatically. That is, the user no longer needs to confirm the deterioration of the output signal from the receiver, because the mixer switching control portion 13 switches between the low-current mixer 6 and the high-linearity mixer 7 according to the electric-field strength of the received signal to obtain a satisfactory output signal from the output terminal 5.

Third Embodiment

In the receiver of a third embodiment of the present invention, in place of the fixed-gain low-noise amplifier used in the first and second embodiments, a variable-gain low-noise amplifier is used. As described earlier, by using a variable-gain type as the low-noise amplifier, it is possible to prevent the signal strength fed to the mixer provided in the succeeding stage from becoming too high. Even then, if the electric-field strength is higher than the variable-gain low-noise amplifier can cope with, the linearity of the input/output characteristic of the mixer provided in the succeeding stage deteriorates.

Figure 6:
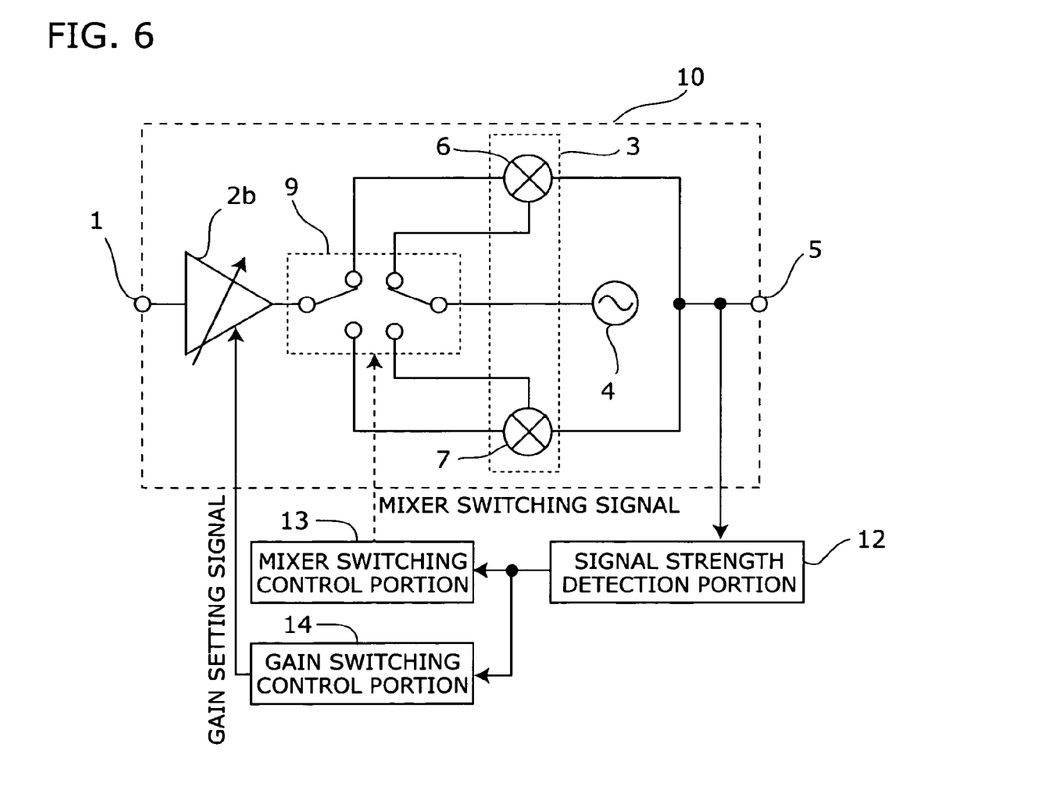
FIG. 6 is a block diagram showing a front-end portion of the receiver of a third embodiment of the invention.

The third embodiment of the present invention will be described below. FIG. 6 is a block diagram showing a front-end portion of the receiver of the third embodiment. In the receiver shown in FIG. 6, such portions as are found also in the receiver shown in FIG. 1 or 3 are identified with common reference numerals, and their detailed explanations will not be repeated.

In the receiver shown in FIG. 6, the low-noise amplifier 2 used in the receiver shown in FIG. 3 is replaced with a variable-gain low-noise amplifier 2b of which the gain can be selected from among a plurality of values or can be varied continuously. Moreover, in addition to the mixer switching control portion 13 that outputs a mixer switching signal for switching between the low-current mixer 6 and the high-linearity mixer 7, a gain switching control portion 14 is additionally provided for setting the gain of the noise amplifier 2b.

In the receiver configured as described above, as in the second embodiment, the mixer switching control portion 13 calculates, based on the signal strength detected by the signal strength detection portion 12 and the sum gain of the low-noise amplifier 2b and the mixer chosen by the mixer portion 3, the electric-field strength of the received radio-frequency signal, then compares the calculated electric-field strength with a predetermined threshold value, and then switches, according to the result of the comparison, the mixer used by the mixer portion 3. Simultaneously, the gain switching control portion 14 calculates, based on the signal strength detected by the signal strength detection portion 12 and the sum gain of the low-noise amplifier 2b and the mixer chosen by the mixer portion 3, the electric-field strength of the received radio-frequency signal, and then feeds, according to the result of the comparison, a gain setting signal to the low-noise amplifier 2b to vary the gain thereof in inverse proportion to the electric-field strength in order to keep the level of the signal fed to the mixer portion 3 within a predetermined range.

With this configuration, as compared with a configuration where a fixed-gain low-noise amplifier is used as the low-noise amplifier 2b, it is possible, when the electric-field strength of the received signal is high, to lower the level of the signal fed to the mixer portion 3. This permits the mixer portion 3 to have a less demanding input/output linearity characteristic. Thus, even when the electric-field strength is high, unless it is extremely so, it is possible to use the low-current mixer 6 and thereby reduce the current consumption and secure the linearity in the input/output characteristic.

However, reception may be performed at an electric-field strength so high that even such combined use of the variable-gain low-noise amplifier 2b and the low-current mixer 6 cannot cope with effectively enough to obtain a satisfactory input/output linearity characteristic. In that case, the signal strength detection portion 12 is so controlled that, when the electric-field strength of the received signal is lower than a predetermined threshold value, the low-current mixer 6 is chosen and, when the electric-field strength of the received signal is higher than the predetermined threshold value, the low-current mixer 7 is chosen. In this way, it is possible to maintain a satisfactory input/output linearity characteristic.

In the receiver of this embodiment, instead of the mixer switching control portion 13, an operation portion 8 as used in the first embodiment may be used so that the user can choose a mixer. With this configuration, while the gain of the low-noise amplifier 2b is controlled by the gain switching control portion 14 according to the electric-field strength of the received signal, the mixer used by the mixer portion 3 is switched between the low-current mixer 6 and the high-linearity mixer 7 through the operation of the operation portion 8 by the user.

When performing switching between the mixers in the mixer portion 3, the mixer switching control portion 13 may be so controlled as to feed a mixer switching signal only if a certain relationship between the electric-field strength of the received signal and the predetermined threshold value has persisted for a predetermined period of time or longer. Alternatively, as described earlier with reference to FIG. 5, the mixers may be switched by the use of the mean value of the electric-field strength that is obtained by making the variation of the electric-field strength gentler. This helps avoid abrupt or instantaneous fluctuation in electric-field strength.

Fourth Embodiment

Figure 7:
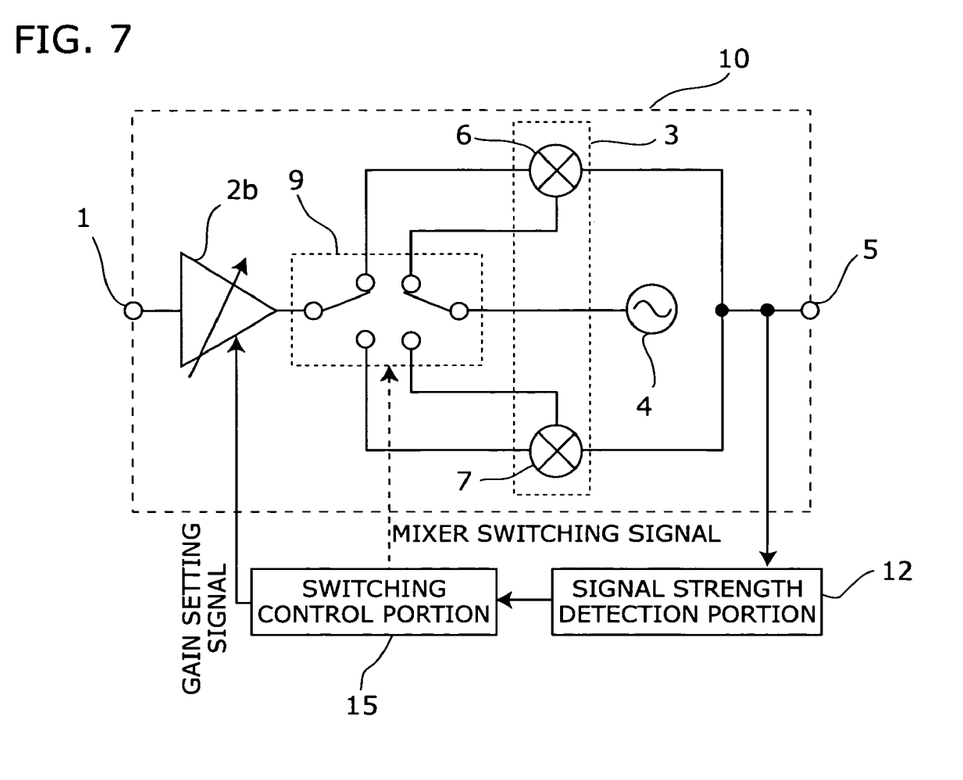
FIG. 7 is a block diagram showing a front-end portion of the receiver of a fourth embodiment of the invention.

A fourth embodiment of the present invention will be described below with reference to the drawings. FIG. 7 is a block diagram showing a front-end portion of the receiver of the fourth embodiment. In the receiver shown in FIG. 7, such portions as are found also in the receiver shown in FIGS. 1, 3, or 6 are identified with common reference numerals, and their detailed explanations will not be repeated.

In the receiver shown in FIG. 7, instead of the mixer switching control portion 13 and the gain switching control portion 14 used in the receiver shown in FIG. 6, a single switching control portion 15 is provided that has the functions of both of them.

In the receiver configured as described above, as in the third embodiment, the switching control portion 15 calculates, based on the signal strength detected by the signal strength detection portion 12 and the sum gain of the low-noise amplifier 2b and the mixer chosen by the mixer portion 3, the electric-field strength of the received radio-frequency signal, then compares the calculated electric-field strength with a predetermined threshold value, and then switches, according to the result of the comparison, the mixer used by the mixer portion 3. Simultaneously, the switching control portion 15 feeds, according to the calculated electric-field strength, a gain setting signal to the low-noise amplifier 2b to vary the gain thereof in inverse proportion to the electric-field strength in order to keep the level of the signal fed to the mixer portion 3 within a predetermined range.

In the receiver of this embodiment, instead of the switching between the mixers by the switching control portion 15, an operation portion 8 as used in the first embodiment may be used so that the user can choose a mixer. With this configuration, while the gain of the low-noise amplifier 2b is controlled by the switching control portion 15 according to the electric-field strength of the received signal, the mixer used by the mixer portion 3 is switched between the low-current mixer 6 and the high-linearity mixer 7 through the operation of the operation portion 8 by the user.

When performing switching between the mixers in the mixer portion 3, the switching control portion 15 may be so controlled as to feed a mixer switching signal only if a certain relationship between the electric-field strength of the received signal and the predetermined threshold value has persisted for a predetermined period of time or longer. Alternatively, as described earlier with reference to FIG. 5, the mixers may be switched by the use of the mean value of the electric-field strength that is obtained by making the variation of the electric-field strength gentler. This helps avoid abrupt or instantaneous fluctuation in electric-field strength.

In the fourth embodiment, the single switching control portion 15 switches between the mixers in the mixer portion 3 and also controls the gain of the low-noise amplifier 2b. This helps reduce the circuit scale.

In the second to fourth embodiments, the receiver may be provided with an operation portion to permit the choice of whether to let the mixer switching control portion 13, gain switching control portion 14, or switching control portion 15 perform their respective control automatically or to let the user perform such control manually via the operation portion. In any of the first to fourth embodiments, the receiver may be built as a one-chip semiconductor integrated circuit device. With this configuration, it is possible to realize a compact receiver that operates with lower current consumption.

What is claimed is:

1. A receiver comprising:
   a low-noise amplifier that amplifies a received signal to output an amplified signal;
   a local oscillator that oscillates a local oscillation signal having a frequency different from a frequency of the amplified signal; and
   a mixer portion that receives the amplified signal and the local oscillation signal to convert the amplified signal into an intermediate-frequency signal having a frequency different from the frequency of the amplified signal and then output the intermediate-frequency signal,
   wherein the mixer portion comprises:
   a first mixer that exhibits a closely linear input/output characteristic in a high-signal-strength range where the amplified signal has a high signal strength;
   a second mixer that operates with lower current consumption than the first mixer and that exhibits, in an ordinary-signal-strength range where the amplified signal has an ordinary signal strength, a linear input/output characteristic and, in the high-signal-strength range where the amplified signal has a signal strength higher than in the ordinary-signal-strength range, a less linear input/output characteristic than the first mixer;
   a mixer switching circuit that receives a switching signal to choose and actuate one of the first and second mixers;
   a signal strength detection portion that detects and outputs a signal strength of the intermediate-frequency signal; and
   a mixer switching control portion that receives the signal strength to calculate an electric-field strength of the received signal based on a sum of a gain of the low-noise amplifier and a gain of whichever of the first and second mixers is chosen and that then, according to the calculated electric-filed strength, feeds the switching signal to the mixer switching circuit,
   wherein the mixer switching control portion compares the calculated electric-field strength with a predetermined threshold value so that,
   if the electric-field strength is higher than the threshold value, it is determined that the amplified signal is in the strength range and the mixer switching control portion outputs a switching signal that instructs the first mixer to be chosen, and
   if the electric-field strength is lower than the threshold value, it is determined that the amplified signal is in the ordinary-signal-strength range and the mixer switching control portion outputs a switching signal that instructs the second mixer to be chosen.

2. The receiver of claim 1,
   wherein the mixer switching control portion compares the calculated electric-field strength with a predetermined threshold value so that,
   if the electric-field strength remains higher than the threshold value for a predetermined period of time, the mixer switching control portion outputs a switching signal that instructs the first mixer to be chosen, and
   if the electric-field strength remains lower than the threshold value for a predetermined period of time, the mixer switching control portion outputs a switching signal that instructs the second mixer to be chosen.

3. The receiver of claim 1,
   wherein the mixer switching control portion calculates a mean value of the calculated electric-field strength for every predetermined period of time, and compares the calculated mean value with a predetermined threshold value so that,
   if the mean value is higher than the threshold value, the mixer switching control portion outputs a switching signal that instructs the first mixer to be chosen, and
   if the mean value is lower than the threshold value, the mixer switching control portion outputs a switching signal that instructs the second mixer to be chosen.

4. The receiver of claim 1, further comprising:
   an operation portion that can be manually operated by a user, wherein the operation portion is adapted to receive an operation by a user to thereby choose the first or second mixer.

5. The receiver of claim 1, wherein the receiver is built as a one-chip semiconductor integrated circuit device.

6. A receiver comprising:
a variable gain low-noise amplifier of which a gain can be varied, that amplifies a received signal to output an amplified signal;
a local oscillator that oscillates a local oscillation signal having a frequency different from a frequency of the amplified signal; and
a mixer portion that receives the amplified signal and the local oscillation signal to convert the amplified signal into an intermediate-frequency signal having a frequency different from the frequency of the amplified signal and then output the intermediate-frequency signal,
wherein the mixer portion comprises:
a first mixer that exhibits a closely linear input/output characteristic in a high-signal-strength range where the amplified signal has a high signal strength;
a second mixer that operates with lower current consumption than the first mixer and that exhibits, in an ordinary-signal-strength range where the amplified signal has an ordinary signal strength, a linear input/output characteristic and, in the high-signal-strength range where the amplified signal has a signal strength higher than in the ordinary-signal-strength range, a less linear input/output characteristic than the first mixer;
a mixer switching circuit that receives a switching signal to choose and actuate one of the first and second mixers;
a signal strength detection portion that detects and outputs a signal strength of the intermediate-frequency signal;
a mixer switching control portion that receives the signal strength to calculate an electric-field strength of the received signal based on a sum of the gain of the variable-gain low-noise amplifier and a gain of whichever of the first and second mixers is chosen and that then, according to the calculated electric-field strength, feeds the switching signal to the mixer switching circuit; and
a gain switching control portion that receives the signal strength to calculate the electric-field strength of the received signal based on the sum of the gain of the variable-gain low-noise amplifier and the gain of whichever of the first and second mixers is chosen and that then, according to the calculated electric-field strength, feeds a gain setting signal to the variable-gain low-noise amplifier to set the gain thereof, wherein the mixer switching control portion compares the calculated electric-field strength with a predetermined threshold value so that, if the electric-field strength is higher than the threshold value, it is determined that the amplified signal is in the high-signal-strength range and the mixer switching control portion outputs a switching signal that instructs the first mixer to be chosen, and, if the electric-field strength is lower than the threshold value, it is determined that the amplified signal is in the ordinary-signal-strength range and the mixer switching control portion outputs a switching signal that instructs the second mixer to be chosen, and
the gain switching control portion outputs the gain setting signal such that the gain of the variable-gain low-noise amplifier is inversely proportional to the calculated electric-field strength.

7. The receiver of claim 6,
wherein the mixer switching control portion compares the calculated electric-field strength with a predetermined threshold value so as to output, if the electric-field strength remains higher than the threshold value for a predetermined period of time, a switching signal that instructs the first mixer to be chosen after a delay of the predetermined period of time, and, if the electric-field strength remains lower than the threshold value for a predetermined period of time, a switching signal that instructs the second mixer to be chosen after a delay of the predetermined period of time.

8. The receiver of claim 6,
wherein the mixer switching control portion calculates a mean value of the calculated electric-field strength for every predetermined period of time, and compares the calculated mean value with a predetermined threshold value so as to output, if the mean value is higher than the threshold value, a switching signal that instructs the first mixer to be chosen and, if the mean value is lower than the threshold value, a switching signal that instructs the second mixer to be chosen.

9. The receiver of claim 6, further comprising:
an operation portion that can be manually operated by a user,
wherein the operation portion is adapted to receive an operation by a user to thereby set the gain of the variable-gain low-noise amplifier and choose the first or second mixer.

10. The receiver of claim 6,
wherein the mixer switching control portion and the gain switching control portion are configured as a single control portion.

* * * * *